United States Patent [19]

Berlincourt

[11] 4,001,615
[45] Jan. 4, 1977

[54] ELECTRICALLY ACTUATED PIEZOELECTRIC HIGH VOLTAGE IMPACT MECHANISM

[76] Inventor: Don A. Berlincourt, Chagrin Falls, Ohio

[22] Filed: May 7, 1973

[21] Appl. No.: 357,647

[52] U.S. Cl. .................. 310/8.3; 310/8.7; 310/9.1; 317/DIG. 11; 431/255
[51] Int. Cl. ............................................. H04r 17/00
[58] Field of Search .................... 310/8.3, 8.7; 317/DIG. 11, 81; 431/255

[56] References Cited
UNITED STATES PATENTS

| | | | |
|---|---|---|---|
| 3,082,333 | 3/1963 | Hufferd et al. | 310/8.3 |
| 3,215,133 | 11/1965 | Farrell | 310/8.3 |
| 3,389,275 | 6/1968 | Brothers | 310/8.3 |
| 3,509,388 | 4/1970 | Mifune et al. | 310/8.7 |
| 3,523,202 | 8/1970 | Maire | 310/8.3 X |
| 3,544,819 | 12/1970 | Good | 310/8.7 |

FOREIGN PATENTS OR APPLICATIONS 1,099,969   1/1968   United Kingdom ............... 310/8.3

Primary Examiner—Mark O. Budd

[57] ABSTRACT

A piezoelectric high voltage impact mechanism is actuated electrically. The impact results from momentary actuation of a wire coil mounted in a magnetic frame. The force on the armature or hammer with electric power connected causes virtual closure of the magnetic circuit as the hammer strikes the adjacent end means of the piezoelectric element means. The resulting stress wave generates a high voltage transient which may be used to ignite gas appliances. The housing for piezoelectric element means is fastened to the magnetic frame. The coil is actuated from a relatively low voltage a-c or d-c power source. When the electric power source is disconnected from the coil the hammer or armature is returned to its initial position by a return spring or the force of gravity.

29 Claims, 14 Drawing Figures

ELECTRICALLY ACTUATED PIEZOELECTRIC HIGH VOLTAGE IMPACT MECHANISM

This invention relates generally to piezoelectric voltage sources and more particularly to a piezoelectric device in which actuation is electrical resulting from the impact of a hammer or armature as it essentially closes the magnetic circuit when a coil linking the magnetic circuit is actuated by electric power. Reference is herewith made to the invention set forth in copending patent application, Ser. No. 357,632, filed simultaneously with this application, and assigned to the same asignee to whom this application is assigned.

Piezoelectric high voltage devices of the impact type are known in the prior art. In such devices the striking mechanism is actuated manually and its most frequently includes a metallic compression spring for driving a hammer against an impact pin held against the piezoelectric element. A return spring generally acts to return the mechanism to its initial configuration. Such devices are manually actuated by axial or rotory motion and are thus not adapted to automatic or remote ignition. See for instance U.S. Pat. No. 3,200,295 (W. H. Owens, issued Aug. 10, 1965).

An electrically actuated piezoelectric high voltage mechanism in which the piezoelectric elements are squeezed rather than struck is described in U.S. Pat. No. 3,544,819 (A. L. Good, issued Dec. 1, 1970). In this device an electric solenoid is actuated, moving a pivoted arm bearing against an adjacent end means of the piezoelectric element and thus stressing the piezoelectric element. The force required of such a solenoid is extremely high in contrast to the situation with this invention. In this invention the armature or hammer is slammed against the adjacent end means of the piezoelectric element as the hammer or armature essentially closes the magnetic circuit. The hammer thus has an opportunity to pick up considerable kinetic energy before impact. Thus electric power and ruggedness and size of mechanical parts are much lower.

A further advantage of this invention over the prior art in an electrically actuated piezoelectric high voltage mechanism involves the absence of a requirement for tight tolerance parts. The present invention thus offers economic and size advantages over previous devices and the operating principles are different.

It is therefore a primary object of this invention to provide a piezoelectric mechanism of the impact type which is directly operable from a low voltage electrical source such as ordinary 117 volt ac lines or even lower ac or dc voltage. It is also an object of this invention to provide an electrically actuated piezoelectric high voltage mechanism of straightforward design which is inexpensive and simple to manufacture.

A further object of this invention is to provide an electrically actuated piezoelectric mechanism which can be adapted to relight automatically gas burners which go out because of short term interruption of gas flow or some other failure. It is a further object of this invention to provide an electrically actuated piezoelectric ignition means which can be readily adapted to remote lighting of fuel burners and to actuation through electronic timing or control circuits. In particular an illustrated preferred embodiment of this invention has a frame of magnetic material with a stationary pole piece and a movable hammer of magnetic material and a coil of wire with the pole piece and movable hammer fitting inside the coil along its axis. The piezoelectric element is abutted to the pole piece such that actuation of the coil causes the hammer to strike the pole piece causing a stress wave in the piezoelectric element. The impact occurs as the magnetic circuit formed by the hammer, pole piece and frame is essentially closed. In another illustrated embodiment of this invention the piezoelectric element is not abutted to a pole piece but as the hammer essentially closes the magnetic circuit it strikes a metal impact pin abutting the piezoelectric element.

Other objects, uses, advantages and novel features of this invention will become apparent as the description proceeds. For a better understanding of the invention, together with other and further objects thereof, reference is had to the following description taken in connection with the accompanying drawings, and its scope will be pointed out in the appended claims.

Figure 1:
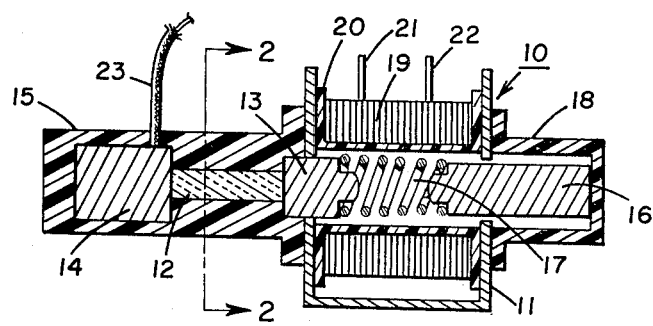
FIG. 1 is a schematic cross-sectional view of an embodiment of the piezoelectric mechanism means of this invention.

Now with reference to FIG. 1 a preferred embodiment of this invention is identified by the number 10. The frame 11 of magnetic material has two holes or slots, in one of which the impact pin or magnetic pole piece 13 of magnetic material is disposed. The hammer 16, also of magnetic material, can move freely through the other hole or slot in the frame. The piezoelectric element 12 is disposed between the impact pin 13 and the metallic anvil 14 inside an insulating housing 15, which comprises a material such as plastic or epoxy. The housing 15 is fastened to the frame 11 by such means as bolts, cement or rivets. Coil 19, which is usually wound on a bobbin of plastic 20, fits inside the frame 11 and around the impact pin 13 and hammer 16. The winding turns of the coil are around the impact pin 13 and hammer 16. The compression spring 17 serves as the return spring, holding the hammer 16 lightly against its housing 18. As shown, the spring fits around a central portion of the hammer and pole piece so that the face of the hammer can be drawn to contact with the pole piece when the coil is actuated. The housing 18 which may be either metallic or insulating is fastened to the frame 11 by such means as cement, bolts or rivets. The unit is actuated by momentary application of electric power to terminals 21 and 22 of the coil. The force developed to close the magnetic circuit is much stronger than that of the rather weak return spring 17, and the hammer 16 strikes the impact pin 13 creating a stress wave in the piezoelectric element, which generates the high voltage power. Note that the impact occurs just as the magnetic circuit is essentially closed. In a minor variation of this embodiment of the unit does not have the return spring 17 and the unit is mounted with rotation 90° clockwise from the position shown in FIG. 1, i.e. with the hammer 16 held away from the impact pin 13 by gravity. Note that the return spring may be magnetic because its cross-section is small. Alternatively, it may be made of phosphor-bronze stainless steel. Note further that in the actuated position the only gap remaining in the magnetic circuit is the small gap between the frame 11 and the hammer 16. Removal of electric power from the terminals 21, 22 causes the magnetic holding force to be reduced to zero except for some slight remanence and the spring 17 pushes the hammer back to the position shown in FIG. 1. The unit is then ready for another cycle.

The piezoelectric element 12 is generally composed of a polycrystalline ceramic material such as lead zirconate titanite or barium titanite or the like and is suitably polarized to be piezoelectrically responsive to compression. The element may or may not have metallic electrodes deposited on its end adjacent to the impact pin 13 and anvil 14. Since high voltages are generated, deposited electrodes such as evaporated silver or gold or fired silver are not required. In such case the metallic parts 13 and 14 act as electrodes as well as mechanical members.

Figure 2:
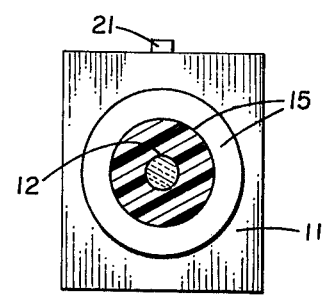
FIG. 2 is a schematic cross-sectional view of the device of FIG. 1 at section 22 in FIG. 1.

FIG. 2 shows another view in cross-section of the embodiment of FIG. 1 taken at section 22 in FIG. 1. This is shown merely for clarification of construction details.

Figure 3:
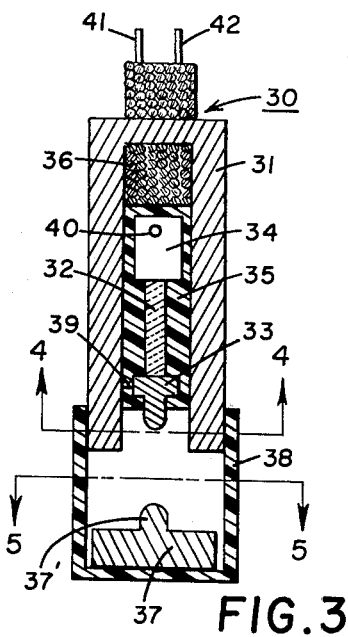
FIG. 3 is a schematic cross-sectional view illustrating another embodiment of the piezoelectric mechanism means of this invention.

Now with reference to FIG. 3 there is shown an embodiment of this invention identified by the number 30. The frame 31 contains a piezoelectric element 32 secured between an impact pin 33 and an anvil 34 imbedded in an insulating housing 35 consisting of material such as plastic or epoxy. The metallic impact pin 33 and anvil 34 are preferably made of nonmagnetic material such as brass so as not to act to short circuit at least partially the magnetic flux circuit. The hammer 37 is made of magnetic material and it is contained in the housing 38. Housing 38 may be composed of insulating material or nonmagnetic metal. If composed of magnetic material such as steel it must have small cross-section so that it readily saturates.

A shorting wire or bar 39 is connected from the impact pin to the metallic frame 31. A wire 40 is connected to the anvil 34. This is the hot lead of this device.

Figure 4:
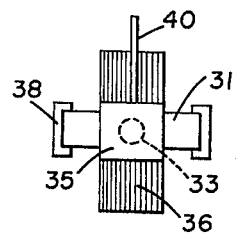
FIG. 4 is a schematic cross-sectional view of the device of FIG. 3 at section 44 in FIG. 3.
Figure 5:
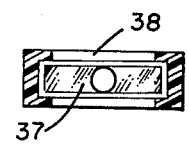
FIG. 5 is a schematic cross-sectional view of the device of FIG. 3 at section 55 in FIG. 3.

The hammer 37 is held in the nonoperated position as shown by gravity, but in another embodiment not illustrated it is held in this position by a relatively weak compression spring. In this case the unit need not be mounted in the position shown. A coil 36 is disposed around the frame 31 as shown. The windings of the coil are around the frame 31. The unit is actuated by application of electric power to terminals 41 and 42 connected to opposite ends of the wire comprising the coil 36. The electric power may be ac or dc and, depending on the number of turns and current rating of the wire comprising the coil 36, voltage may vary at least over the range from 6 to 250 volts. When electric power is connected to the coil, the hammer is attracted to the frame 31. Just before the hammer 37 impacts the frame 31 its tip 37' strikes the compact pin 33, sending a stress wave through the piezoelectric element 32. Thus the impact occurs as the magnetic circuit is essentially closed. The stress wave generates a voltage transient, which will cause a spark discharge at an appropriate electrode gap not shown. This is discussed further in connection with the embodiment of FIG. 1. The other views of the device of FIG. 3 shown in FIG. 4 and 5 show further details of the construction. The hammer 37 is guided by the housing 38 which is fastened to the frame 31 by such means as cement or rivets or bolts.

Figure 6:
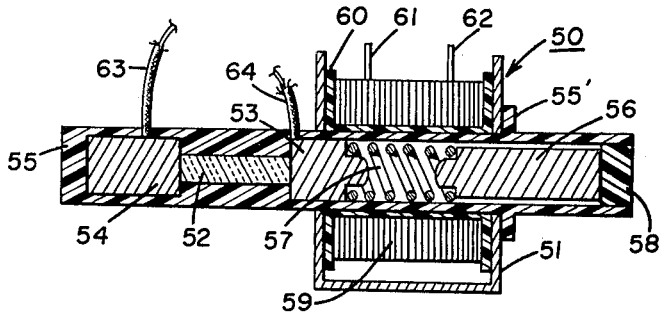
FIG. 6 is a schematic cross-sectional view of another embodiment of the piezoelectric mechanism means of this invention in which two ignition sparks are provided, one to each of two burners.

Now with reference to FIG. 6 another preferred embodiment of this invention is identified by the number 50. This embodiment is in many respects similar to that of FIG. 1. It differs only in that the housing 55 electrically insulates the impact pin 53 and the hammer 56 from the frame 51 and further that there are two high voltage wires 63 and 64 connected to the anvil 54 and the impact pin 53 respectively. The use of more than one high voltage wire is described in FIG. 11 which will be discussed in detail. In the embodiment of FIG. 6 the insulating housing 55 also contains the return spring 57 and hammer 56. The hammer is held in by the plug 58 which may be metallic or insulating but is preferably insulating. The housing 55 is held in the frame 51 by cement, bolts, rivets or the like at the flange 55'. The flange also acts to locate the housing 55 accurately in the frame 51 so that the proper magnetic circuit is obtained. Alternately, for instance, the housing 55 could be cemented to the bobbin 60 or frame 51 or held in by clips at both ends. In the operated condition only two small gaps in the magnetic circuit remain, one between the impact pin 53 and frame 51, and one between the hammer 56 and frame 51. When the coil is energized, the hammer is attracted to the impact pin and the magnetic circuit is essentially closed at impact.

Figure 7:
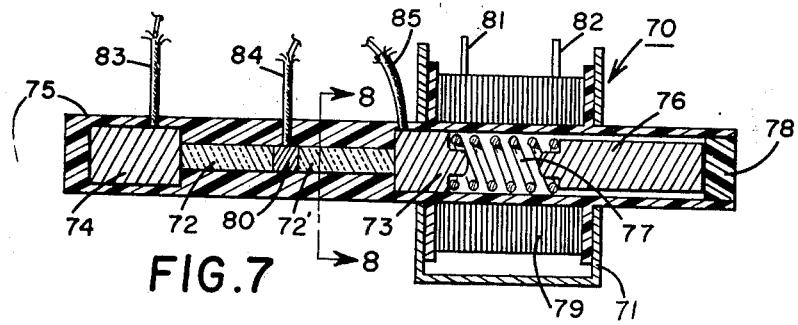
FIG. 7 is a schematic cross-sectional view of another embodiment of the piezoelectric mechanism means of this invention in which three ignition sparks are provided, one to each of three burners.
Figure 8:
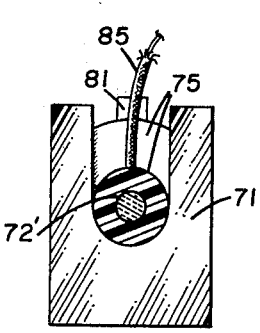
FIG. 8 is a schematic cross-sectional view of the device of FIG. 7 at section 88 in FIG. 7.

FIG. 7 illustrates another embodiment of this invention. This differs from the embodiment shown in FIG. 6 in that there are two piezoelectric elements (72 and 72') separated by a metallic member 80 and three high voltage wires 83, 84 and 85 connected to the anvil 74, metallic member 80 and impact pin 73 respectively. In this particular embodiment the coil bobbin is formed as part of the housing 75. The coil 79 is then wound around this bobbin before the housing is placed in the frame 71. As illustrated in the cross-sectional drawing of FIG. 8, which is taken at section 88 in FIG. 7, the frame is slotted to accept the housing 75. This may simply be a tight fit or the housing may be held in by cement, rivets or bolts or the like. The piezoelectric elements 72 and 72' are arranged such that the faces abutting the metallic member 80 are of the same polarity, i.e. for ceramic elements they were connected to the same high voltage supply polarity during the poling process. Here again, operation of the device occurs when the coil 79 is actuated, and in the operated position the magnetic circuit is virtually closed as the hammer 76 strikes the impact pin 73.

Figure 9:
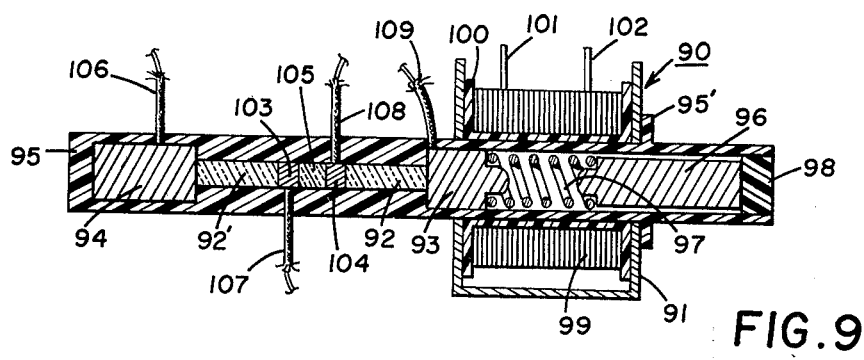
FIG. 9 is a schematic cross-sectional view of another embodiment of the piezoelectric mechanism of this invention in which four ignition sparks are provided, one to each of four burners.

FIG. 9 illustrates another embodiment of this invention, differing principally from the embodiment of FIG. 7 in that the two piezoelectric elements 92 and 92' are separated by an insulator 105 and two metallic members 103 and 104, and there are four high voltage wires 106, 107, 108 and 109. It is understood that if there are deposited electrodes on the elements 92 and 92' the metallic members 103 and 104 may be omitted with wires abutting the electrode edges. A similar situation exists with reference to FIG. 7. Nevertheless, the metallic members allow a better quality connection and are preferred.

Figure 10:
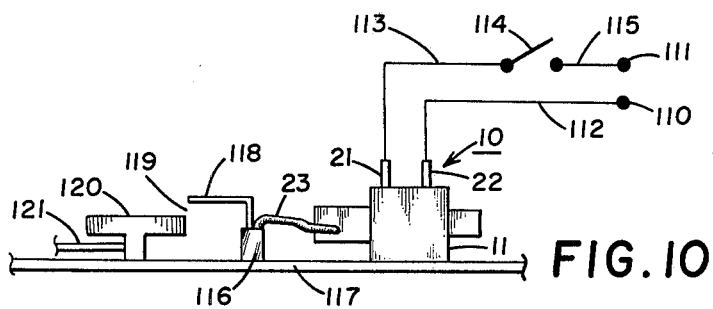
FIG. 10 is a schematic diagram showing use of the piezoelectric mechanism means of FIG. 1 to ignite a gas burner.

FIG. 10 illustrates a simple application of a piezoelectric mechanism according to the invention in igniting a gas burner. The gas burner 120 has a gas-air mixture supply line 121. The igniter 10 is actuated by closure of the switch 114 which connects the voltage source at terminals 111 and 110 to the igniter terminals 21 and 22 through wires 113-115 and 112 respectively.

The frame 11 of the igniter is attached by such means as rivets or bolts to the burner frame 117 and the high voltage is applied to the discharge gap 119 between the electrode tip 118 and the burner 120 through the high voltage wire 23. The wire and electrode tip are insulated from the frame by the insulator 116, which is preferably ceramic such as steatite due to proximity to the burner. The switch 114 may be actuated by a simple mechanism controlled by the gas valve handle or both the valve and the switch may be controlled by automatic circuitry. It is clear that the switch 114 may be located at a considerable distance from the piezoelectric mechanism and fuel burner.

Figure 11:
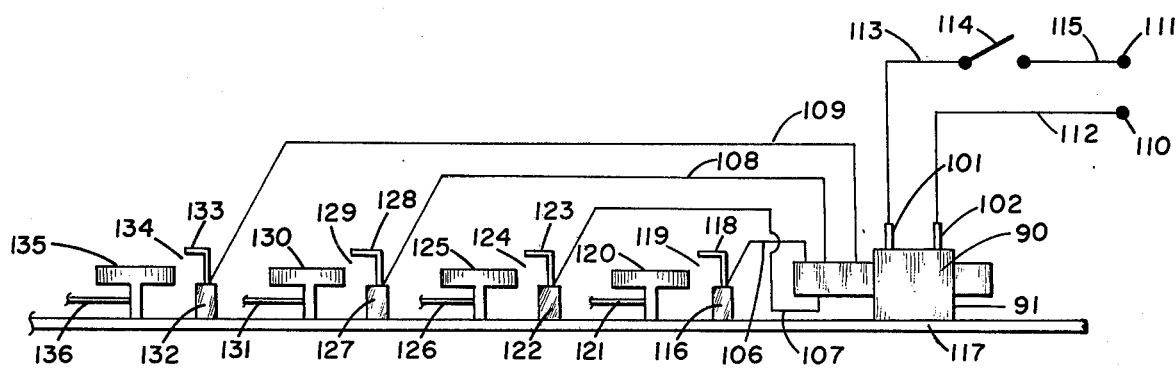
FIG. 11 is a schematic diagram showing use of the piezoelectric mechanism means of FIG. 9 to ignite any one or combination of four gas burners.

FIG. 11 illustrates use of a single piezoelectric mechanism according to this invention in which four burners may be ignited in any sequence or combination. The piezoelectric mechanism 90 is of the type illustrated in FIG. 9 with four high voltage wires 106, 107, 108 and 109.

When the switch 114 is closed, high voltage is applied to the gaps 119, 124, 129 and 134 at the burners 120, 125, 130 and 135. There are two independent high voltage discharge paths with common ground defined by frame 117 of the burners and frame 91 of the piezoelectric mechanism. One circuit is for lead 106 through electrode tip 118 and gap 119 through ground 120-117-125 and gap 124, electrode tip 123 to lead 107. Leads 106 and 107 are at opposite ends of piezoelectric element 92. A similar circuit through gaps 129 and 134 may be traced to the two ends of piezoelectric element 92 through leads 108 and 109. If, for instance, burner 120 is already on and it is desired to ignite burner 125, switch 114 is closed and even though the flame at burner 120 causes a virtual short circuit at gap 119, a discharge occurs at gap 123 igniting burner 125.

In like manner it can be shown that the burners can be ignited in any order or simultaneously in any combination regardless of which others are already burning.

A simple system could involve four switches, which could be mercury type switches or spring contact switches or the like, one ganged to each valve controlling gas flow to each line (121, 126, 131, 136) and all connected in parallel such that operation of any valve control will first initiate gas flow and then close the switch to actuate the piezoelectric mechanism 90 at maximum on the valve and then remove power to the piezoelectric mechanism 90 as the flame is adjusted.

It is clear that various automatic systems can be utilized simply and easily with a piezoelectric high voltage mechanism which can be operated by application of a short pulse of electric power to the mechanism actuating coil.

Figure 12:
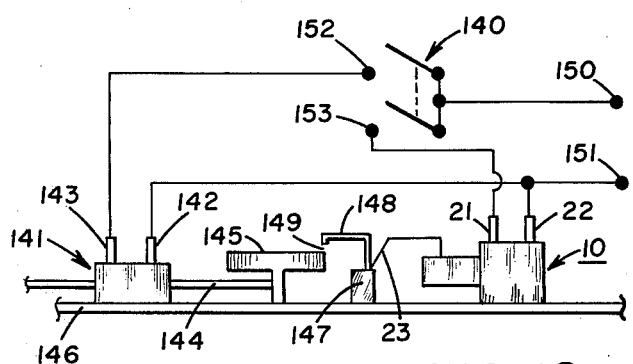
FIG. 12 is a schematic diagram showing use of the piezoelectric mechanism means of FIG. 1 with a solenoid gas valve to ignite a gas burner.

Now with specific reference to FIG. 12 there is shown a typical system in which the fuel supply is turned on electrically and then ignited by actuation of an electrically actuated impact piezoelectric mechanism designated by the numeral 10. The switch 140 is of the type in which upon actuation the contacts at 152 close first and remain closed. Further movement of the switch makes momentary contacts at 153; upon release, the contacts at 152 remain closed, those at 153 open. For turning on the burner 145 the switch 140 is actuated connecting the electrical power source at terminals 150, 151 to terminals 143, 142 of solenoid valve 141 which then supplies fuel to burner 145 through line 144. Air is also supplied to the burner in the usual fashion. Momentary closure of contacts at 153 supplies power also to terminals 21, 22 of the piezoelectric mechanism 10. This creates a discharge at gap 149 between electrode tip 148 and burner 145, igniting the fuel. As the burner continues to function the contacts at 152 are closed and those at 153 are open. The burner is extinguished by opening the contacts at 152. Note that the switch 140 could be a wall thermostat when burner 145 is in a furnace.

Figure 13:
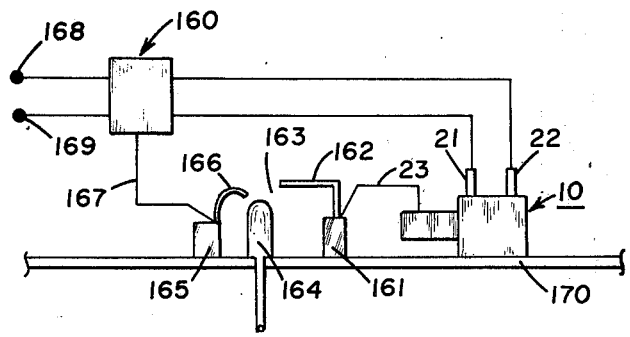
FIG. 13 is a schematic diagram showing use of the piezoelectric mechanism means of FIG. 1 in an automatic relite system.

Now with reference to FIG. 13, there is shown an automatic relight system containing an electrically actuated piezoelectric impact mechanism according to this invention. A flame sensing device is situated close to the burner 164, which may be a pilot burner. The flame sensing device illustrated comprises an insulator 165 and an electrode tip 166. This particular device senses the presence of a flame by the resistance in the gap between the tip 166 and the burner 164. When a flame is present, the electrical resistance is low because of ionization of the gas; when the flame is absent the resistance is very high. The electronic switch 160 is actuated when flame is absent and it connects electrical power at terminals 168, 169 to terminals 21, 22 of the electrically actuated piezoelectric impact mechanism 10. The connection is preferably made for short periods only on a cyclic basis and may continue until a flame is sensed at the gap between electrode tip 166 and burner 164. The ignition discharge occurs at gap 163 between burner 164 and electrode tip 162 connected to the piezoelectric device 10 by wire 23. If, as in many systems, a thermocouple near burner 164 controls a gas valve, there is a time period between flame outrage and sufficient cooling of the thermocouple to shut off the gas valve. The illustrated system may, during this period, initiate reignition and thus keep the thermocouple from interrupting gas flow. A timing circuit or mechanism may be included with the electronic circuit 160 in case the burner cannot be ignited after a preset period to disable the reignition system.

Figure 14:
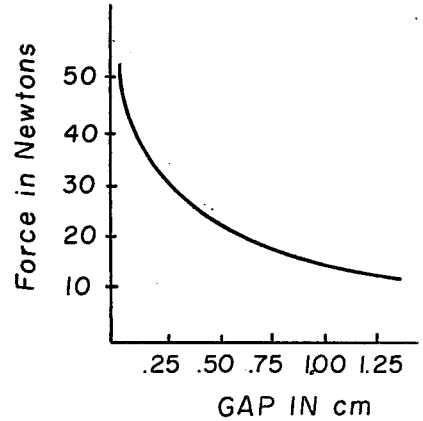
FIG. 14 is a schematic diagram showing a typical magnetic circuit force-gap curve for a small ac solenoid.

Now with reference to FIG. 14, there is shown a typical force-gap curve for a small pulse duty ac solenoid. Note that pulse or intermittant duty coils are fully satisfactory for igniters of this invention because only pulses are required and resulting heat rise is very low. The large increase in pull with low magnetic gap is sufficient to cause an impact of the hammer as it essentially closes the magnetic circuit of a typical device of this invention to develop over 20 kV with a tpyical lead titanite zirconate element 1.5 cm long and 6 mm in diameter. One such device has a coil with outside diameter 2.3 cm and length 2.5 cm; the diameter of the hammer or armature is 9.5 mm.

It is understood that the frames for the piezoelectric mechanisms of this invention may comprise a nonconducting ceramic ferrite magnetic material as well as magnetic metal, although in most cases the latter will be less expensive and offers mechanical advantages. When a nonconducting frame is used with the embodiments of FIGS. 1 and 3, for instance, for single burner applications, it will be necessary to connect a second wire from the impact pin (13 in FIG. 1 and 33 in FIG. 3) to the burner or burner frame.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. An electrically actuated impact type piezoelectric mechanism comprising:
   piezoelectric element means effective to provide an electrical spark source in response to mechanical actuation thereof;
   frame means of magnetic material;
   coil means;
   hammer means; disposed such that actuation of coil means from a low voltage electrical power source causes impact of the hammer against adjacent end means of piezoelectric element means as the magnetic circuit is essentially closed;
   in combination with burner system means comprising:
   at least one air-fuel mixture burning device;
   at least one electrode tip means connected electrically to the high voltage output of the piezoelectric mechanism and located adjacent to at least one air-fuel mixture burning device;
   electric switch control means to connect and disconnect electric power to coil means of the piezoelectric mechanism.

2. An electrically actuated impact type piezoelectric mechanism in combination with burner system means according to claim 1 in which hammer means and frame means of piezoelectric mechanism form essentially a closed magnetic circuit when coil means is actuated.

3. An electrically actuated impact type piezoelectric mechanism in combination with burner system means according to claim 1 in which one terminal of piezoelectric element means is connected electrically to frame means.

4. An electrically actuated impact type piezoelectric mechanism in combination with burner system means according to claim 1 in which two terminals of piezoelectric element means are electrically insulated from frame means and burner system means includes two air-fuel mixture burning devices each with an associated electrode tip.

5. An electrically actuated impact type piezoelectric mechanism in combination with burner system means according to claim 1 in which piezoelectric element means comprises two piezoelectric elements, one end of each connected electrically to the other, both elements insulated electrically from frame means.

6. An electrically actuated impact type piezoelectric mechanism in combination with burner system means according to claim 1 in which piezoelectric element means comprises two piezoelectric elements insulated electrically from each other and frame means.

7. An electrically actuated impact type piezoelectric mechanism in combination with burner system means according to claim 3 with first terminal of piezoelectric element means electrically connected to frame means; frame means electrically connected to said air-fuel mixture burning device; electrode tip means electrically connected to second terminal of piezoelectric element means and providing a spark gap proximate to flow of said fuel.

8. An electrically actuated impact type piezoelectric mechanism in combination with burner system means according to claim 4 with two air-fuel mixture burning devices and two electrode tip means electrically connected to opposite ends of piezoelectric element means, each electrode tip means providing a spark gap proximate to one of said burners.

9. An electrically actuated impact type piezoelectric mechanism in combination with burner system means according to claim 5 with three air-fuel mixture burning devices and three electrode tip means; each electrode tip means providing a spark gap proximate to one of said burners.

10. An electrically actuated impact type piezoelectric mechanism in combination with burner system means according to claim 6 with four air-fuel mixture burning devices and four electrode tip means, each electrode tip means providing a spark gap proximate to one of said burners.

11. An electrically actuated impact type piezoelectric mechanism in combination with burner system means according to claim 1 with mechanical valve means to control fuel flow to air-fuel mixture burning devices and with electrical switch control means mechanically coupled to mechanical valve means of air-fuel mixture burning devices.

12. An electrically actuated impact type piezoelectric mechanism in combination with burner system means according to claim 1 with electrically controlled valve means to control fuel flow to air-fuel mixture burning devices and with electric switch control means to connect and disconnect electric power to electrically controlled valve means.

13. An electrically actuated impact type piezoelectric mechanism in combination with burner system means according to claim 1 with electronic control means connected to coil means to detect flame outage and initiate reigntion.

14. An electrically actuated impact type piezoelectric mechanism comprising:

piezoelectric element means effective to provide an electrical spark source in response to mechanical actuation thereof:

frame means of magnetic material;

pole piece means of magnetic material inserted in said frame means;

hammer means of magnetic material;

coil means; the magnetic circuit thus arranged such that actuation of coil means from a low voltage electrical power source causes hammer means to strike pole piece means, essentially closing the magnetic circuit;

in combination with burner system means comprising;

at least one air-fuel mixture burning device;

at least one electrode tip means connected electrically to the high voltage output of the piezoelectric mechanism and located adjacent to at least one air-fuel mixture burning device;

electric switch control means to connect and disconnect electric power to coil means of the piezoelectric mechanism.

15. An electrically actuated impact type piezoelectric mechanism in combination with burner system means according to claim 14 in which hammer means is mounted coaxially with pole piece means.

16. An electrically actuated impact type piezoelectric mechanism in combination with burner system means according to claim 15 in which hammer means is free to pass through a hole or slot in frame means.

17. An electrically actuated impact type piezoelectric mechanism in combination with burner system means according to claim 16 in which the winding of coil means is about the axis of pole piece means and hammer means.

18. An electrically actuated impact type piezoelectric mechanism in combination with burner system means according to claim 17 in which pole piece means abutts piezoelectric element means.

19. An electrically actuated impact type piezoelectric mechanism in combination with burner system means according to claim 14 in which one terminal of piezoelectric element means is connected electrically to frame means.

20. An electrically actuated impact type piezoelectric mechanism in combination with burner system means according to claim 14 in which two terminals of piezoelectric element means are electrically insulated from frame means and burner system means includes two air-fuel mixture burning devices each with an associated electrode tip.

21. An electrically actuated impact type piezoelectric mechanism in combination with burner system means according to claim 14 in which piezoelectric element means comprises two piezoelectric elements, one end of each connected electrically to the other, both elements insulated electrically from frame means.

22. An electrically actuated impact type piezoelectric mechanism in combination with burner system means according to claim 14 in which piezoelectric element means comprises two piezoelectric elements insulated electrically from each other and frame means.

23. An electrically actuated impact type piezoelectric mechanism in combination with burner system means according to claim 19 with first terminal of piezoelectric element means electrically connected to frame means and frame means electrically connected to said air-fuel mixture burning device; electrode tip means electrically connected to second terminal of piezoelectric element means and providing a spark gap proximate to flow of said fuel.

24. An electrically actuated impact type piezoelectric mechanism in combination with burner system means according to claim 20 with two air-fuel mixture burning devices and two electrode tip means electrically connected to opposite ends of piezoelectric element means; each electrode tip means providing a spark gap proximate to one of said burners.

25. An electrically actuated impact type piezoelectric mechanism in combination with burner system means according to claim 21 with three air-fuel mixture burning devices and three electrode tip means, each electrode tip means providing a spark gap proximate to one of said burners.

26. An electrically actuated impact type piezoelectric mechanism in combination with burner system means according to claim 22 with four air-fuel mixture burning devices and four electrode tip means, each electrode tip means providing a spark gap proximate to one of said burners.

27. An electrically actuated impact type piezoelectric mechanism in combination with burner system means according to claim 14 with mechanical valve means to control fuel flow to air-fuel mixture burning devices and with electrical switch control means mechanically coupled to mechanical valve means of air-fuel mixture burning devices.

28. An electrically actuated impact type piezoelectric mechanism in combination with burner system means according to claim 14 with electrically controlled valve means to control fuel flow to air-fuel mixture burning devices and with electrical switch control means to connect and disconnect electric power to electrically controlled valve means.

29. An electrically actuated impact type piezoelectric mechanism in combination with burner system means according to claim 14 with electronic control means connected to coil means to detect flame outage and initiate reignition.

* * * * *